Nov. 13, 1956   F. E. CULVERWELL   2,770,150
FRONT AXLE

Filed Aug. 7, 1953   2 Sheets-Sheet 1

INVENTOR.
FRANK E. CULVERWELL
BY
McMorrow, Berman & Davidson
ATTORNEYS

INVENTOR.
FRANK E. CULVERWELL
BY
McMorrow, Berman & Davidson
ATTORNEYS

United States Patent Office 2,770,150
Patented Nov. 13, 1956

2,770,150

FRONT AXLE

Frank E. Culverwell, Mesquite, Nev.

Application August 7, 1953, Serial No. 378,312

1 Claim. (Cl. 74—710)

This invention relates to automotive vehicles of the four wheel drive type and more particularly to an axle for the front wheels thereof.

It is well known that automotive vehicles equipped with four wheel drive loses speed and requires more power on the highway when the four wheel drive is not in use. This is due to the constant rotation of the front differential gearing while the vehicle is in motion, even though the drive to the front wheels is disconnected.

It is, therefore, the primary object of this invention to provide an engaging and disengaging mechanism for the front wheel drive in which the front differential gear is not turned with the rotation of the front wheels when the drive to these wheels is disengaged. This results in an automotive vehicle of the four wheel drive type which will operate on the highways in the same manner as the conventional rear drive vehicles. The resultant saving in operating costs and the increase in speed and the requirement for less power from this invention will be evident.

It is a further object of this invention to provide an engaging and disengaging mechanism for the front wheel drive that can be applied to the existing front wheel drive differentials.

Briefly, this invention utilizes a pair of simultaneously operated drive clutches which will engage a two-part, axially aligned front axle to short stub shafts extending from and operatively connected to the differential gearing. When the drive is disconnected by manipulation of the drive clutches, rotation of the front wheels will turn only the respective axle parts, rather than the entire differential gearing as in the present four wheel drive vehicles, so that the vehicle can operate in the same manner as the more conventional two wheel drive automotive vehicles.

Other objects and advantages will become apparent from the following detailed description forming the specification, taken in conjunction with the accompanying drawings, in which.

Figure 1:
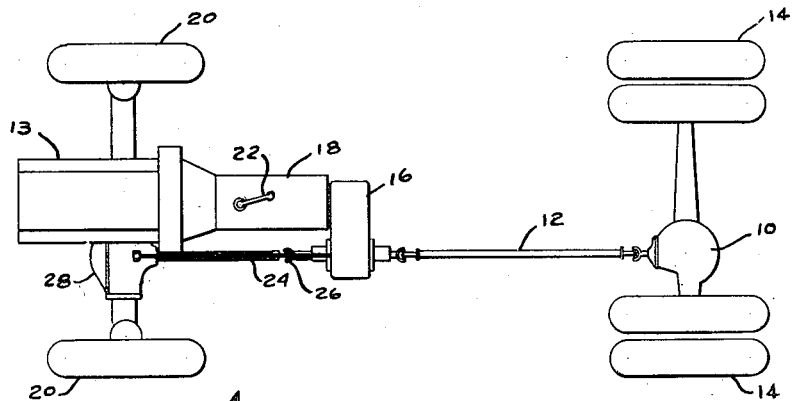
Figure 1 is a top plan view of a portion of an automotive vehicle chassis equipped with four wheel drive to which this invention is applied.

With reference to Figure 1, there is shown that portion of the chassis of an automotive vehicle which contains the drive transmission arrangement. The rear differential 10 is of usual construction receiving its power from a motor 13, schematically shown, through a drive shaft 12 to cause rotation of the rear set of wheels 14. The drive shaft 12 extends between the rear differential 10 and a transfer case 16. A gear transmission is contained in a transmission housing 18 and the transmission gears for the drive to the front set of wheels 20 are also housed therein. The drive transmission engagement for the front wheels is controlled by a shifting lever 22 on the housing 18.

A drive transmission arrangement for the front wheels 20 generally similar to the driving arrangement for the rear set of wheels 14 is provided and comprises a drive shaft 24 connected through the usual universal joint 26 to the transfer case 16 at one end and to the front differential gearing in the housing 28 at its other end. The front wheels 20 are driven from the front differential gearing. The foregoing is the conventional arrangement of elements in a four wheel drive vehicle.

The differential gearing within the housing 28 is conventional, the ring gear 30, pinion 32 and the oppositely disposed splined drive sleeves 34 in axial alignment being visible in the several views of the drawings. Up to this point the construction forms no part of the invention.

Figure 3:
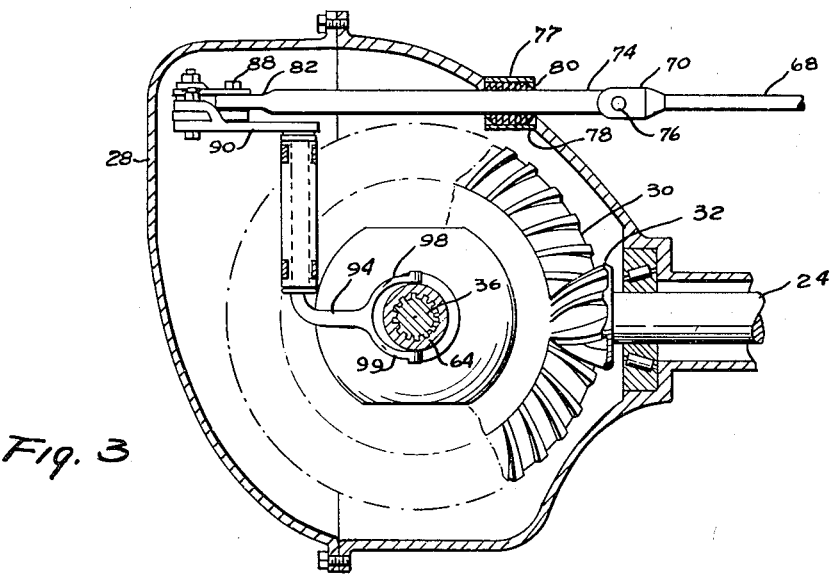
Figure 3 is a sectional view taken on line 3—3 of Figure 2.
Figure 4:
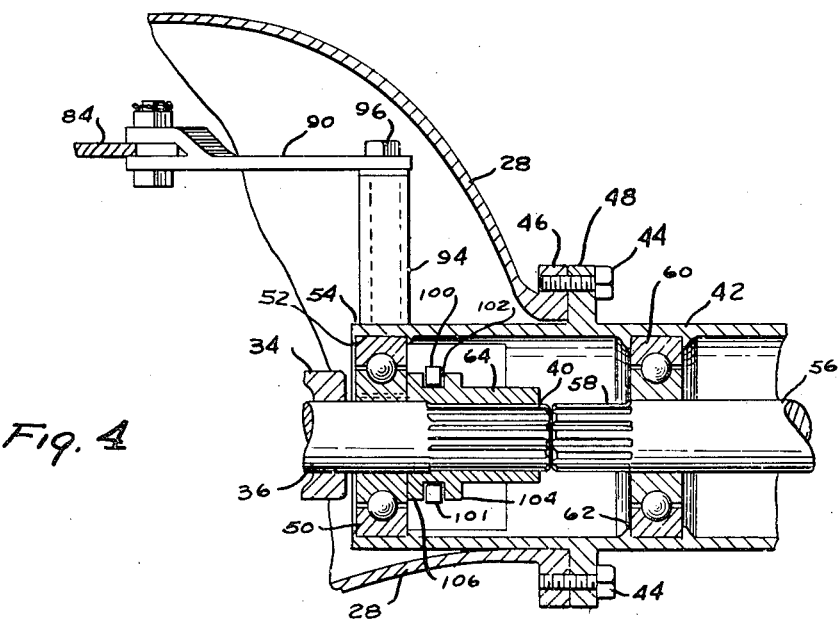
Figure 4 is a sectional view taken on line 4—4 of Figure 2.

Since the mechanism comprising this invention is substantially duplicated on each side of the transmission gearing, the construction only on one side, upper portion in Figure 2 and to the right in Figures 3 and 4, will be described in detail.

A short stub shaft 36 is splined at each end, 38 and 40 respectively. The end 38 is received into the complementary splines in the drive sleeve 34 and extends centrally into an axle housing 42 carried by the differential housing 28 and secured thereto by bolts 44 connecting registering flanges 46 and 48 carried by the differential housing and the axle housing respectively. A ball bearing 50 is seated in a grooved recess 52 adjacent the end 54 of axle housing 42 and said bearing supports the stub shaft 36 intermediate its ends.

An axle 56, in axial alignment with stub shaft 36, is operatively connected at one end to the front wheels 20 in the ordinary manner. The other end 58 of the axle is splined in closely spaced relation with the end 40 of stub shaft 36 and in axial alignment therewith. The shaft 36 and axle 56 are of approximately the same diameter, and the splines on the almost abutting ends are also in alignment (see Figure 4). A ball bearing 60, similar to the bearing 50, is retained in a recessed groove 62 in the axle housing 42 to support the axle 56 adjacent its end 58 so that axle 56 can rotate freely within the bearing 60.

Up to this point it will be seen that axle 56 is capable of rotation within axle housing 42, when the wheel 20 is in motion, without causing rotation of the differential gearing.

In order to transmit driving power from the front differential to the wheels 20, a drive clutch 64 is provided with internal splines, the lands of which complement the grooves on the splines on the ends 40 and 58 of shaft 36 and axle 56 respectively and the clutch is adapted to slide thereon. In the inoperative or disengaged position, the clutch 64 will be carried exclusively by the shaft 36. As the shift lever 22 is moved to place the vehicle in four wheel drive, a linkage is also actuated in response thereto and causes the clutch to slide from its inactive position on shaft 36 to engage the splines on the end 58 of axle 56 to provide a driving connection or coupling between shaft 36 and axle 56. Thus, the driving power from the differential gearing may be transmitted to the front wheels 20.

The linkage by which the driving clutch 64 may be shifted into and out of engagement with the axle 56 will now be described. As the shifting lever 22 is moved so as to enmesh the proper gears in the transfer case 16 so as to impart rotation to the front drive shaft 24, another lever 66, operatively connected to lever 22 by linkage (not shown) in a well known manner, is simultaneously actuated so as to reciprocate in a vertical plane. A rod 68 provided at either end with similar bifurcated extensions 70 receives the lever 66 therein at one end and is operatively connected thereto as by pin 72, while the other end of arm 68 receives a flattened portion of a rod 74 in the bifurcation at that end and is operatively connected thereto as by pin 76 passing through both ears of the bifurcation and through the flat portion of the rod 74 held therebetween. A cylindrical bracket 77 is mounted on the differential housing 28. As best illustrated in Figure 3, the bracket 76 partially enters an opening 78 in the housing 28 and contains an annular packing 80 through which rod 74 may slide. The packing 80 also forms a support for the rod 74. The end of rod 74 opposite to its connection to the arm 68 is likewise flattened as at 82 and has a toggle connection with lever arms 84 and 86. One end of each of the lever arms 84 and 86 being connected to the flattened end 82 of rod 74 as by the bolt 88 carrying the usual nut by which these parts may be secured together.

Figure 2:
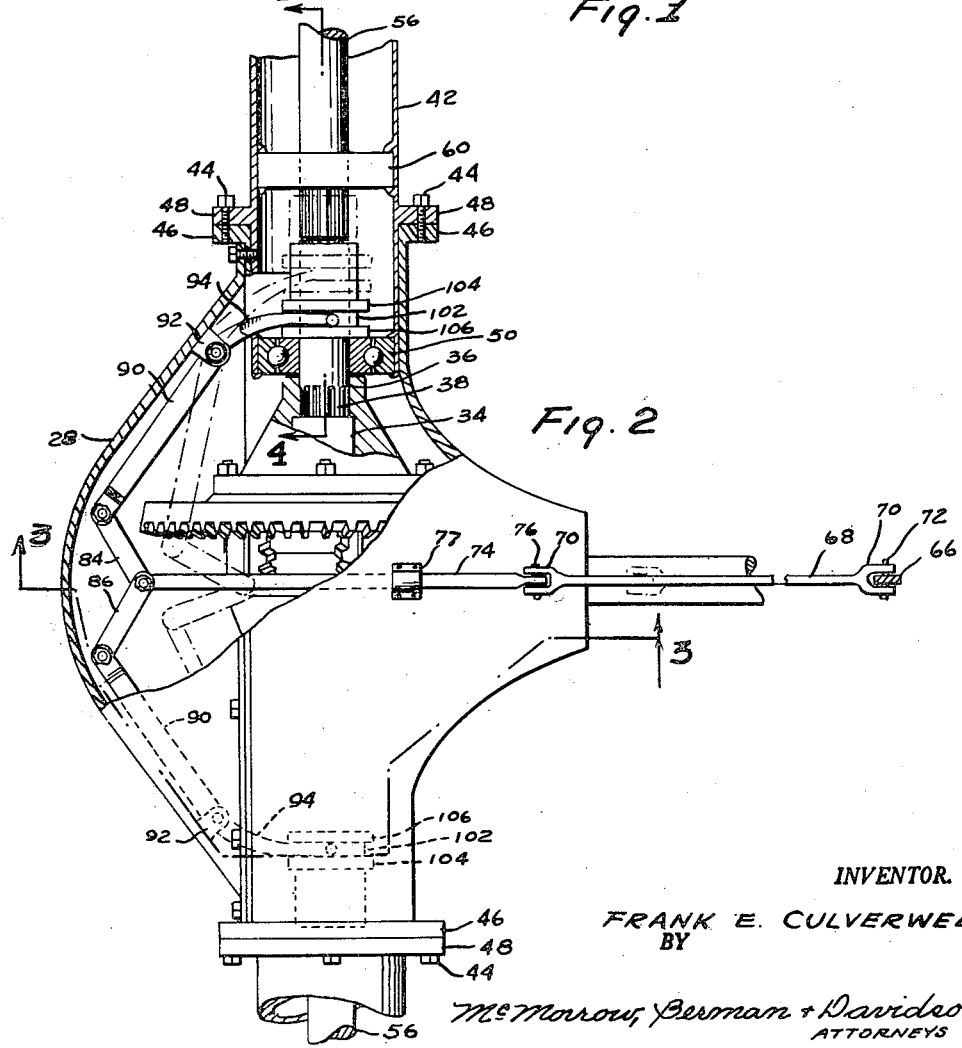
Figure 2 is a partial view of the front differential and axle housing partially broken away to show the operative mechanism constructed according to this invention.

As best seen in Figure 2, links 84 and 86 extend in angular relation to rod 74 and are pivotally connected thereto by the bolt 88. Referring now only to the one side of the differential housing which is shown in the upper portion of Figure 2 and to the right in Figures 3 and 4, the remainder of the linkage will be described, it being understood that the parts now described will be duplicated on the other side of the differential gearing and function in the same manner. A lever 90 is bifurcated at one end to receive the end of link 84 opposite its connection to the rod 74 and pivotally connected therein as by a nut and bolt. The other end of lever 90 is pivotally secured to a bracket carried on the interior of the housing 28. This bracket 92 also pivotally carries a shifting fork 94. Both the end of the arm 90 and the end of the shifting fork 94 are pivotally carried in the bracket 92 as by the bolt 96. The shifting fork 94, see Figure 3, carries a pair of arcuately shaped, oppositely disposed arms 98 and 99. The end of each of the arms 98 and 99 carry cylindrical projections 100 and 101 respectively which act as followers in a groove 102 formed by a pair of flanges 104 and 106 formed integrally with the drive clutch 64.

The same linkage and shifting fork is similarly operatively connected to a drive clutch to the opposite side to the side just described, and the drive clutches on both sides will operate simultaneously.

As shown in the dotted line position shown in Figure 2, as the lever 66 is actuated by the shift lever 22, it will pull the connected rod 68 and rod 74 to the right causing the toggle formed by lever arms 84 and 86 to move also to the right carrying with it the arms 90 which in turn will cause the shifting fork 94 to move upwardly, as viewed in Figure 2 and force the drive clutch 64 to bridge the gap between the stub shaft 36 and the axle 56 thus completing a driving connection or coupling therebetween. In the dotted line position just described, it will be evident that the front wheels are in driving engagement with the front differential gearing.

Of course, to disengage the front wheel drive, the lever 22 is shifted in the proper direction causing the linkage 66—68—74—84, 86—90 and shifting fork 94 to return to the full line position of Figure 2. This, of course, will cause the driving clutch to return to its position wherein it is completely carried upon the splines upon the end 40 of the stub shaft 36. The driving connection between the front wheels and the front differential is now broken, and the front wheels upon rotation will cause rotation only of the axle 56 on the right hand side as viewed in Figure 4 and its counterpart on the left hand side, or lower portion shown in Figure 2.

From the foregoing, it will be seen that the conventional front differential housing has been cut at either side in the direction of the axle, a flange provided at that end for attachment to a complementary flange on the axle housing; and the axle itself is not directly driven by the differential gearing but terminates within the axle housings on either side of the differential housing a short distance from a stub shaft which is in operative engagement with the respective driving sleeves of the differential gearing. The operative connection between the shafts and the axle parts is a pair of simultaneously operated drive clutches which shift to bridge the gap between the respective stub shaft and axle in response to movement of the shift lever in the interior of the vehicle.

While there is shown and described the preferred embodiment of the invention, it is to be understood that the structure is susceptible to change and modification within the practicability of the invention and therefore should be limited only by the scope of the claim appended hereto.

What is claimed is:

In an automotive vehicle of the four-wheel drive type including a front differential housing having differential gearing therein for driving the front wheels, the improvement residing in the combination of means for preventing rotation of said front differential gearing when said gearing is not drivingly engaged with said front wheels, said means comprising opposed coaxially aligned stub shafts operatively connected at one end to said differential gearing and extending outwardly therefrom, a wheel axle in end-to-end relation with each of said stub shafts, said axle rotatably mounting the front wheels adjacent the end thereof remote from said stub shaft and the end adjacent said stub shaft having external splines, the end of said stub shaft remote from said gearing being externally splined, a drive clutch having internal splines carried by each of said stub shafts on the splined end thereof for movement longitudinally thereof into and out of operative connection to the adjacent splined end of the wheel axle for operative connection with the latter for transmitting the drive of said gearing to the front wheel; with linkage means carried by and disposed within said housing and operatively connected to said drive clutches, and actuating means carried on the vehicle and operatively connected to said linkage means for selectively simultaneously moving said linkage means and the drive clutch on each of said stub shafts into and out of operative connection with the adjacent wheel axle end.

References Cited in the file of this patent

UNITED STATES PATENTS

| | | |
|---|---|---|
| 1,061,450 | Coleman | May 13, 1913 |
| 1,119,284 | Holterman | Dec. 1, 1914 |
| 1,351,942 | Chapron | Sept. 7, 1920 |
| 1,440,341 | Crispen | Dec. 26, 1922 |
| 1,458,877 | Dair | June 12, 1923 |
| 1,938,848 | Matthews | Dec. 12, 1933 |

FOREIGN PATENTS

| | | |
|---|---|---|
| 172,992 | Austria | Nov. 10, 1952 |
| 731,988 | Germany | Feb. 19, 1943 |
| 1,001,390 | France | Oct. 24, 1951 |